(12) United States Patent
Brown

(10) Patent No.: US 8,769,830 B1
(45) Date of Patent: Jul. 8, 2014

(54) GRASS CUTTER AND ASSOCIATED METHOD

(76) Inventor: Olin Brown, Columbia, SC (US)

( * ) Notice: Subject to any disclaimer, the term of this patent is extended or adjusted under 35 U.S.C. 154(b) by 205 days.

(21) Appl. No.: 13/016,727

(22) Filed: Jan. 28, 2011

Related U.S. Application Data

(60) Provisional application No. 61/299,058, filed on Jan. 28, 2010.

(51) Int. Cl.
*A01D 34/90* (2006.01)
(52) U.S. Cl.
USPC .............................. 30/276; 30/347; 56/12.7
(58) Field of Classification Search
USPC .......... 30/276, 198; 56/12.7; D32/15; 15/344, 15/327.5
See application file for complete search history.

(56) References Cited

U.S. PATENT DOCUMENTS

| | | | | | |
|---|---|---|---|---|---|
| 70,861 | A | * | 11/1867 | Kingsley | 30/198 |
| 1,374,768 | A | * | 4/1921 | Ruppert | 30/249 |
| 1,597,272 | A | * | 8/1926 | Finkhousen | 55/310 |
| 2,232,261 | A | * | 2/1941 | Orr | 56/17.4 |
| 2,263,431 | A | * | 11/1941 | White | 56/13.4 |
| 2,730,803 | A | * | 1/1956 | Kimball | 30/390 |
| 2,968,903 | A | * | 1/1961 | Kesling | 56/10.1 |
| 3,011,299 | A | * | 12/1961 | Classon | 56/17.3 |
| 3,886,716 | A | * | 6/1975 | Sellers | 56/17.4 |
| 4,179,805 | A | * | 12/1979 | Yamada | 30/122 |
| 4,224,784 | A | | 9/1980 | Hansen et al. | |
| 4,848,846 | A | * | 7/1989 | Yamada et al. | 30/276 |
| 4,879,869 | A | | 11/1989 | Buckendorf, Jr. | |
| 4,890,389 | A | * | 1/1990 | Whitkop | 30/276 |
| 5,025,560 | A | * | 6/1991 | Townsend | 30/298 |
| 5,402,550 | A | * | 4/1995 | Lessard | 15/143.1 |
| 5,651,418 | A | * | 7/1997 | Jerez | 172/14 |
| 5,940,973 | A | * | 8/1999 | Kitz | 30/276 |
| 6,014,812 | A | * | 1/2000 | Webster | 30/276 |
| 6,154,918 | A | * | 12/2000 | Cain et al. | 15/327.5 |
| 6,260,278 | B1 | * | 7/2001 | Faher | 30/276 |
| 6,675,565 | B2 | | 1/2004 | Appleyard | |
| 6,745,549 | B1 | | 6/2004 | Taylor | |
| 7,107,745 | B2 | | 9/2006 | Dunda | |
| 7,603,782 | B2 | * | 10/2009 | Jerez | 30/276 |
| 2003/0005674 | A1 | | 1/2003 | Powell | |
| 2006/0112568 | A1 | * | 6/2006 | Jerez | 30/276 |

* cited by examiner

*Primary Examiner* — Laura M Lee

(57) ABSTRACT

The hand held grass cutter preferably includes an elongated handle provided with a user interface adapted to be held by a user, a motor located at the handle wherein the motor is communicatively coupled to the user interface, a cutting mechanism located at a distal end of the handle and communicatively coupled to the motor; and a disc section adjustably attached to the handle and spaced subjacent to the cutting mechanism.

10 Claims, 11 Drawing Sheets

GRASS CUTTER AND ASSOCIATED METHOD

CROSS REFERENCE TO RELATED APPLICATIONS

This application claims the benefit of U.S. Provisional Application No. 61/299,058, filed Jan. 28, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to grass cutters and, more particularly, to a grass cutter for providing a user with an easy and convenient means to take the weight off the operation of the grass cutter.

2. Prior Art

No matter what the size of your home is, plants, shrubs or trees, as well as healthy green grass on your lawn definitely add beauty and value to your dwelling. A well-maintained lawn can be an ideal setting to relax by yourself or entertain friends and family. A thick layer of healthy, green grass which is neat and trimmed is one of the main components that make up a well-maintained lawn. The most common type of grass used for lawns is Bermuda grass, which thrives in warm climates. Among the other types of grass which can be used is the centipede grass, which is ideal for areas with acidic soil, while Zoysia is suitable for areas with cold weather.

However, no matter what type of grass is planted, they have to be cut and trimmed to its ideal height so that pest problems may be controlled. A plant with an ideal length will also make the grass absorb sunlight better while retaining more moisture. Lawn care and maintenance is therefore one of the chores that most homeowners must do, and further there is such a sense of fulfillment and joy brought about by a thriving lawn or garden that homeowners treat these kind of activities as a hobby.

The basic tools for maintaining a lawn includes hand and powered tools that are considered essential for keeping that green carpet in shape. A powered lawnmower is the most basic. But keeping the lawn neat is almost always a matter that can't be completely carried out just by mowing. A cutter or edger is also needed for example to run the blade alongside patio bricks, steps and other edges to keep the lawn trim and looking good. Usually a powered cutter comes with a long handle with cutting means such as a rotating blade or a plastic string attached to its lower end. A user has to hold the long handle and position the blades a few inches above the ground to ensure that the ideal height of the grass to be cut is maintain before proceeding to switch on his cutter. Holding such an appliance for long periods of time can contribute to back pain and other bodily strains. An unfit person may find it extremely difficult to undertake such a task on a routine basis before resorting to paid help which may be quite costly.

Accordingly, a need remains for a grass cutter in order to overcome the above-noted shortcomings. The present invention satisfies such a need by providing a grass cutter that is convenient and easy to use, lightweight yet durable in design, versatile in its applications, and designed for providing a user with an easy and convenient means to take the weight off the operation of a grass cutter.

BRIEF SUMMARY OF THE INVENTION

In view of the foregoing background, it is therefore an object of the present invention to provide a hand held grass cutter having a weighted disc to counter balance a mass of the grass cutter. These and other objects, features, and advantages of the invention are provided by a hand held grass cutter preferably including an elongated handle provided with a user interface adapted to be held by a user, a motor located at the handle wherein the motor is communicatively coupled to the user interface, a cutting mechanism located at a distal end of the handle and communicatively coupled to the motor; and a disc section adjustably attached to the handle and spaced subjacent to the cutting mechanism.

In a non-limiting exemplary embodiment, the disc section may include a disc spaced beneath the cutting mechanism, a rectilinear support arm mated to an outer circumference of the disc and angularly offset from the handle, and an attachment bracket connected to the handle and adjustably connected to the support arm respectively.

In a non-limiting exemplary embodiment, the attachment bracket may be situated above the cutting mechanism. Further, the support arm may have a proximal end pivotally coupled to the attachment bracket as well as a distal end statically mated with the disc at a location subjacent to the cutting mechanism.

In a non-limiting exemplary embodiment, the cutting mechanism may include a plurality of blades communicatively coupled to the motor, and a power source communicatively coupled to the user interface. In this manner, the user interface may be disposed at a proximal end of the handle and oppositely spaced from the disc section disposed at the distal end of the handle.

In a non-limiting exemplary embodiment, linear reciprocation of the attachment bracket along a first linear path of the handle preferably causes linear reciprocation of the disc along a second linear path. Such a first linear path may be registered parallel to a longitudinal length of the handle and the second linear path may be registered orthogonal to a rotating plane of the blades.

In a non-limiting exemplary embodiment, the disc may have planar top and bottom surfaces positioned below the blades while the support arm remains attached to the attachment bracket.

In a non-limiting exemplary embodiment, a shield having a semi-circular shape may be attached to the distal end of the handle such that the blades are intercalated between the shield and the disc.

In a non-limiting exemplary embodiment, a curvilinear wrist brace may be attached to a proximal end of the handle and extends away from the cutting mechanism.

In a non-limiting exemplary embodiment, a method of utilizing a hand held grass cutter may include the chronological steps of: providing an elongated handle may have a user interface adapted to be held by a user; providing and locating a motor at the handle wherein the motor is communicatively coupled to the user interface; providing and locating a cutting mechanism at a distal end of the handle; communicatively coupling the cutting mechanism to the motor; providing and adjustably attaching a disc section to the handle; spacing the disc section subjacent to the cutting mechanism; and selectively displacing the disc section between alternate positions defined beneath the cutting mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
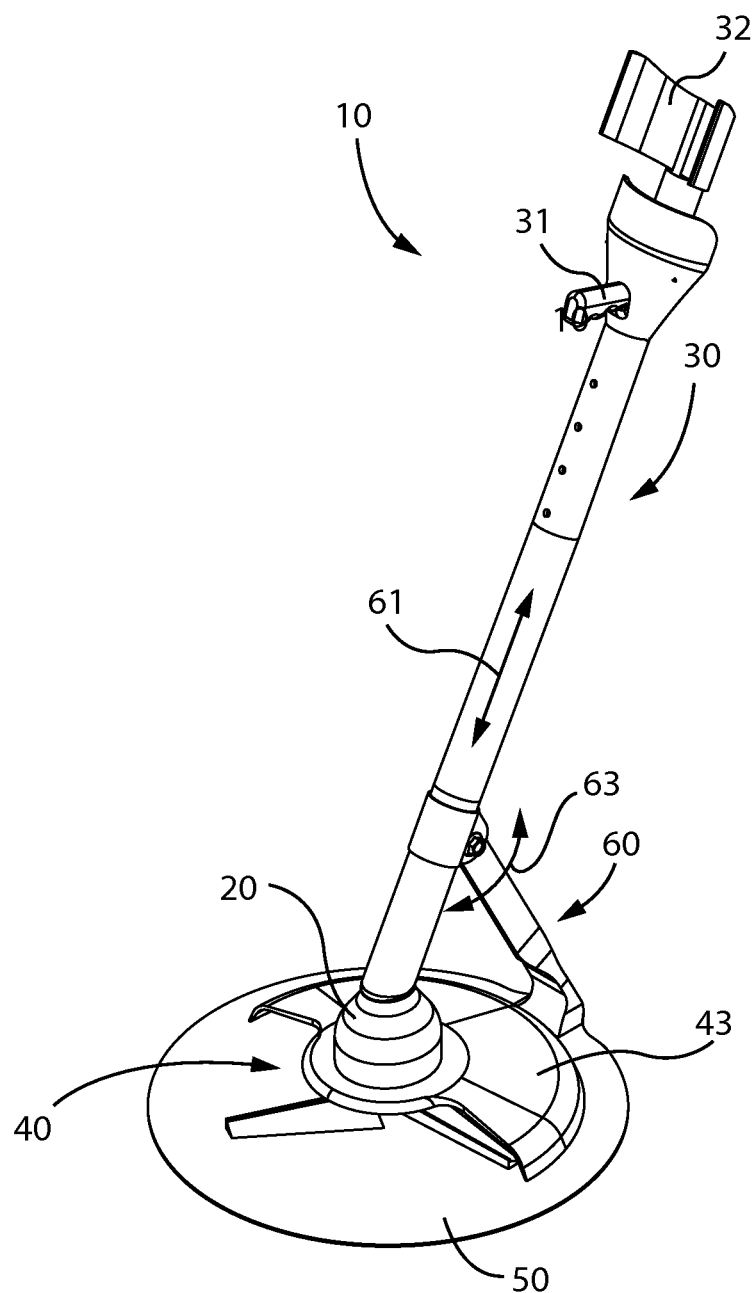
FIG. 1 is a front perspective view showing a hand held grass cutter having a disc situated below its cutting mechanism, in accordance with the present invention.
Figure 2:
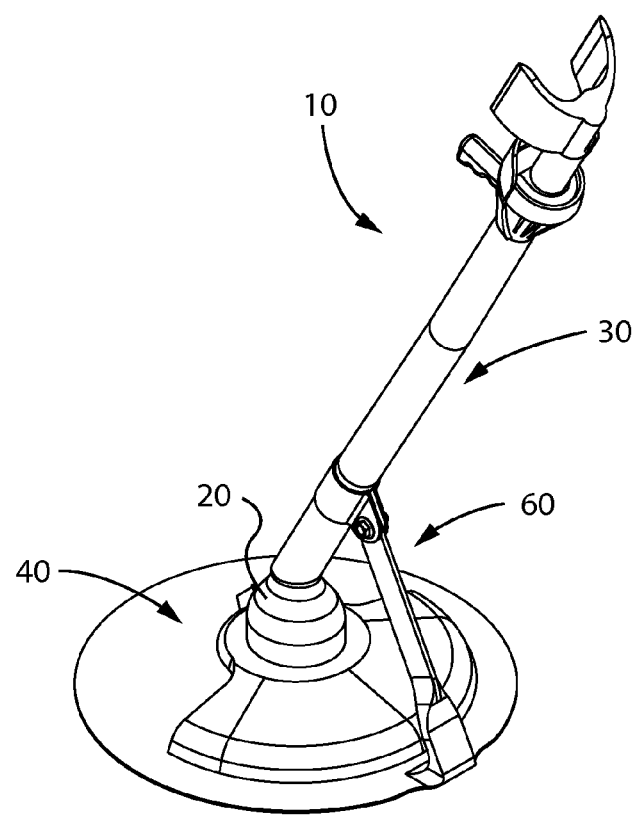
FIG. 2 is a rear perspective view of the grass cutter shown in FIG. 1.
Figure 3:
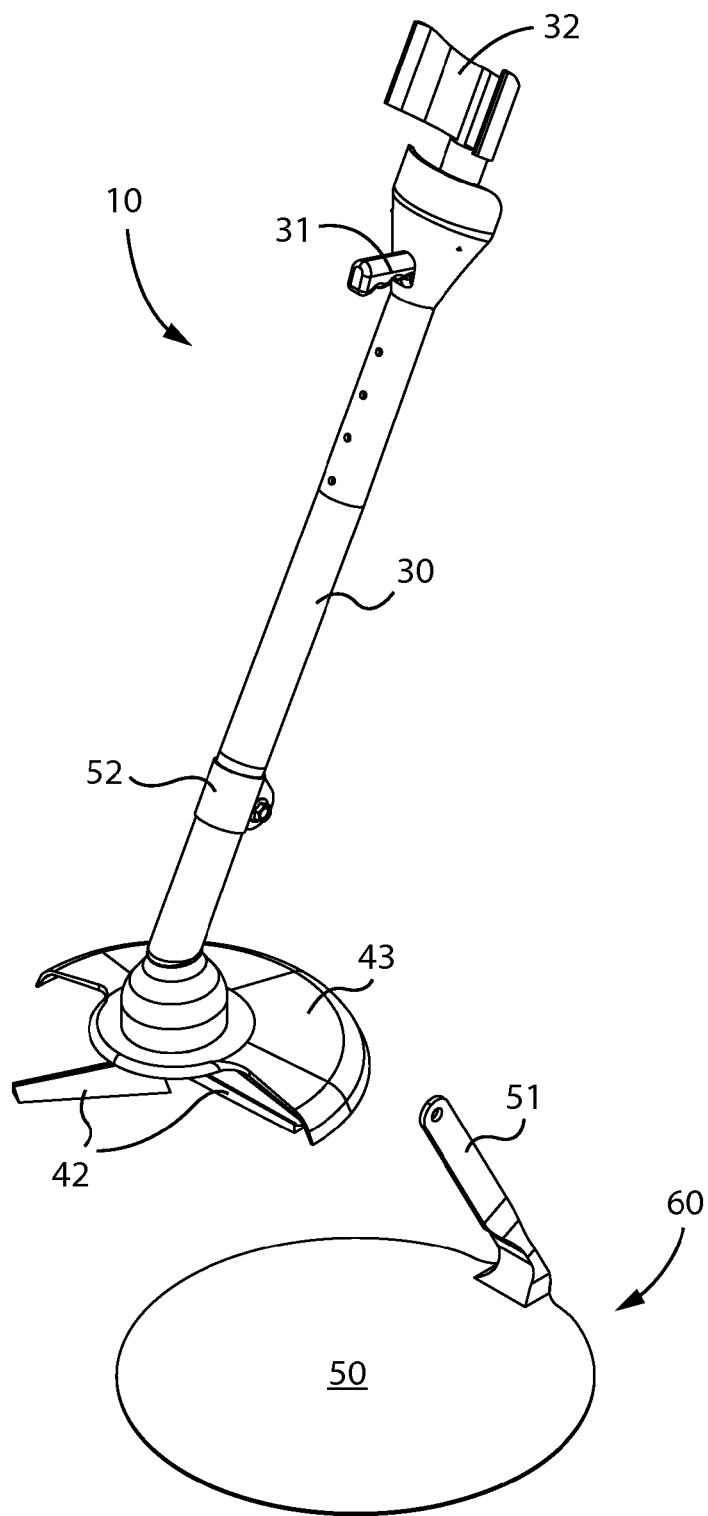
FIG. 3 is a partially exploded view showing the support arm separated from the attachment bracket.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-7 and is intended to provide a grass cutter 10 with weight supporting means. It should be understood that the present invention may be used to cut and trim grasses and many different types of plants and shrubs, and should not be limited to the uses described herein.

The hand held grass cutter 10 preferably includes an elongated handle 30 provided with a user interface 31 adapted to be held by a user, a motor 20 located at the handle 30 wherein the motor 20 is communicatively coupled to the user interface 31, a cutting mechanism 40 located at a distal end of the handle 30 and communicatively coupled to the motor 20; and a disc section 60 adjustably attached to the handle 30 and spaced subjacent to the cutting mechanism 40. Such a structural configuration provides the unexpected and unpredictable advantage of maintaining a center of mass of the grass cutter 10 adjacent to a location of the cutting mechanism 40 for assisting a user to efficiently maneuver the grass cutter 10.

In a non-limiting exemplary embodiment, the disc section 60 may include a disc 50 spaced beneath the cutting mechanism 40, a rectilinear support arm 51 mated to an outer circumference of the disc 50 and angularly offset from the handle 30, and an attachment bracket 52 connected to the handle 30 and adjustably connected to the support arm 51, respectively. Such a structural configuration provides the unexpected and unpredictable advantage of enabling a user to quickly modify a position of the disc 50 without having to detach the disc section 60 from the handle 30 nor detach the cutting mechanism 40 from the handle 30.

In a non-limiting exemplary embodiment, the attachment bracket 52 may be situated above the cutting mechanism 40. Further, the support arm 51 may have a proximal end pivotally coupled to the attachment bracket 52, as well as a distal end statically mated with the disc 50 at a location subjacent to the cutting mechanism 40. Such a structural configuration provides the unexpected and unpredictable advantage of alternating an angle 63 of the support arm 51 relative to the handle 30 in order to raise/lower the disc 50 relative to the location of the cutting mechanism 40.

In a non-limiting exemplary embodiment, the cutting mechanism 40 may include a plurality of blades 42 communicatively coupled to the motor 20, and a power source 41 communicatively coupled to the user interface 31. In this manner, the user interface 31 may be disposed at a proximal end of the handle 30 and oppositely spaced from the disc section 60 disposed at the distal end of the handle 30.

Figure 4:
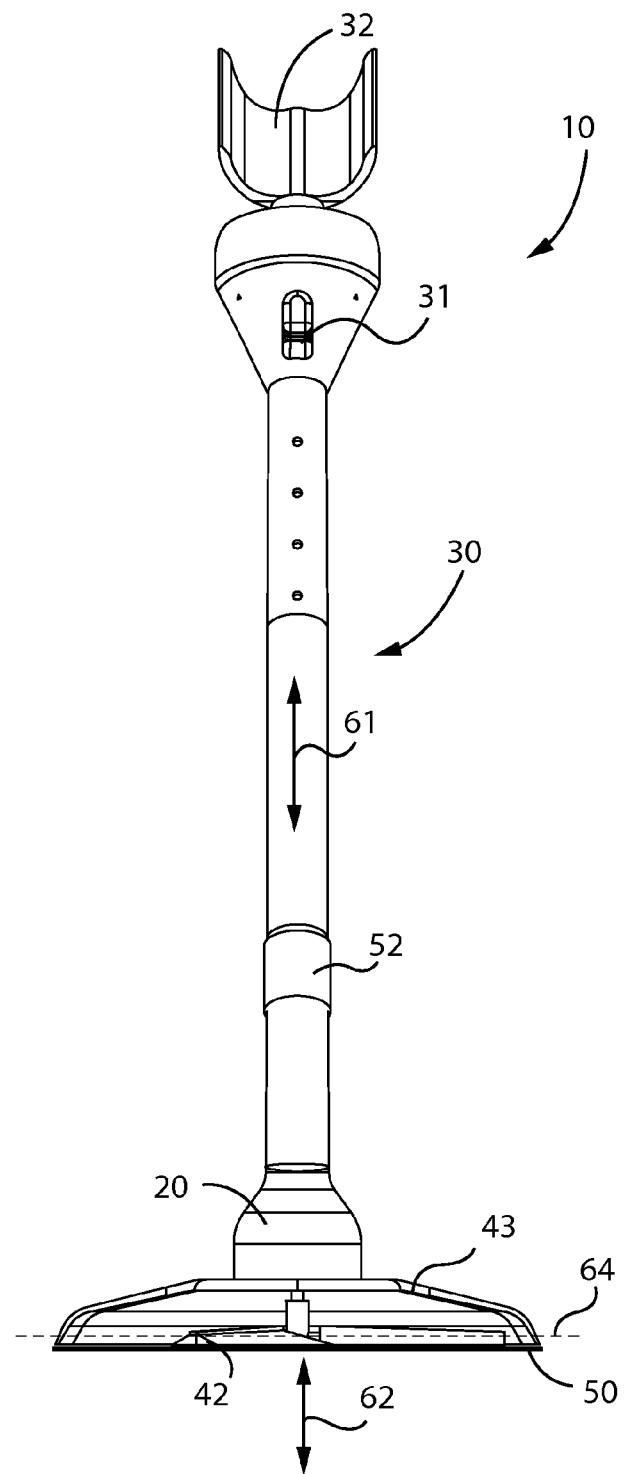
FIGS. 4-4b is a front elevational view showing the orientation of the disc below the blades.
Figure 4A:
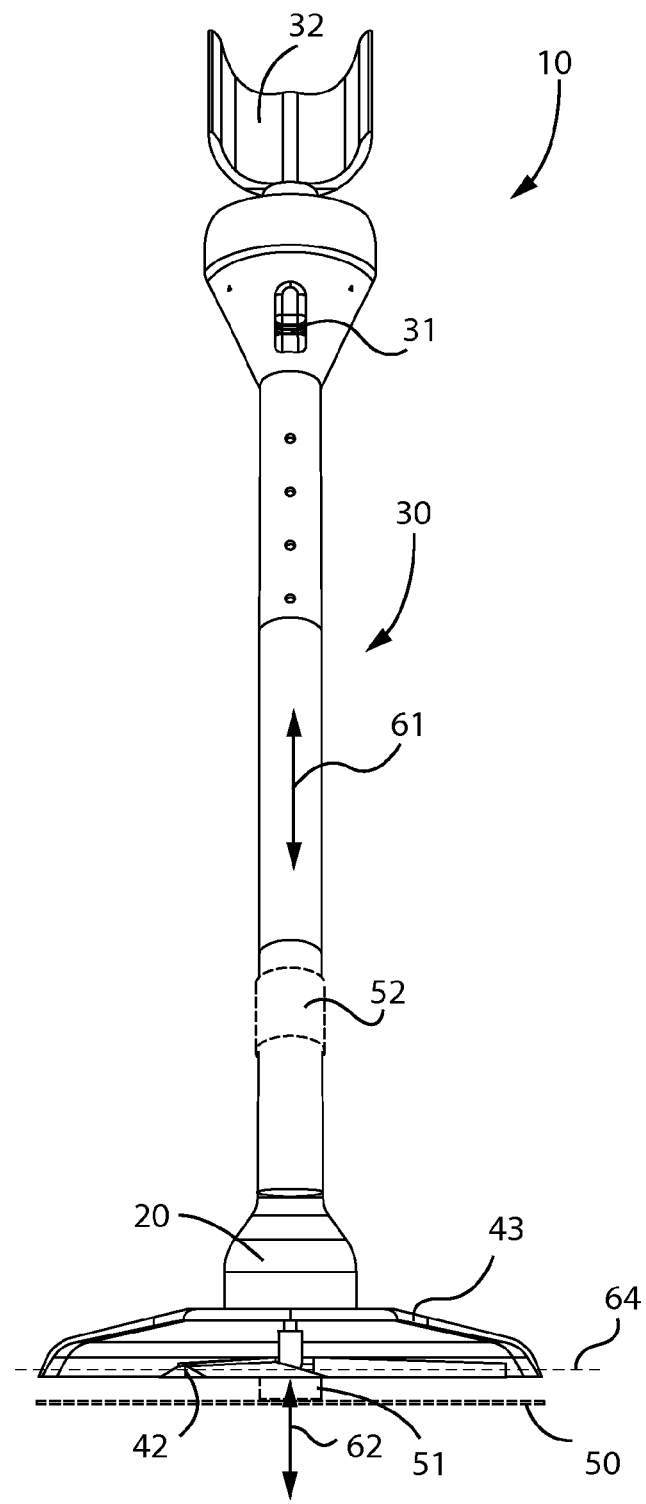
Figure 4B:
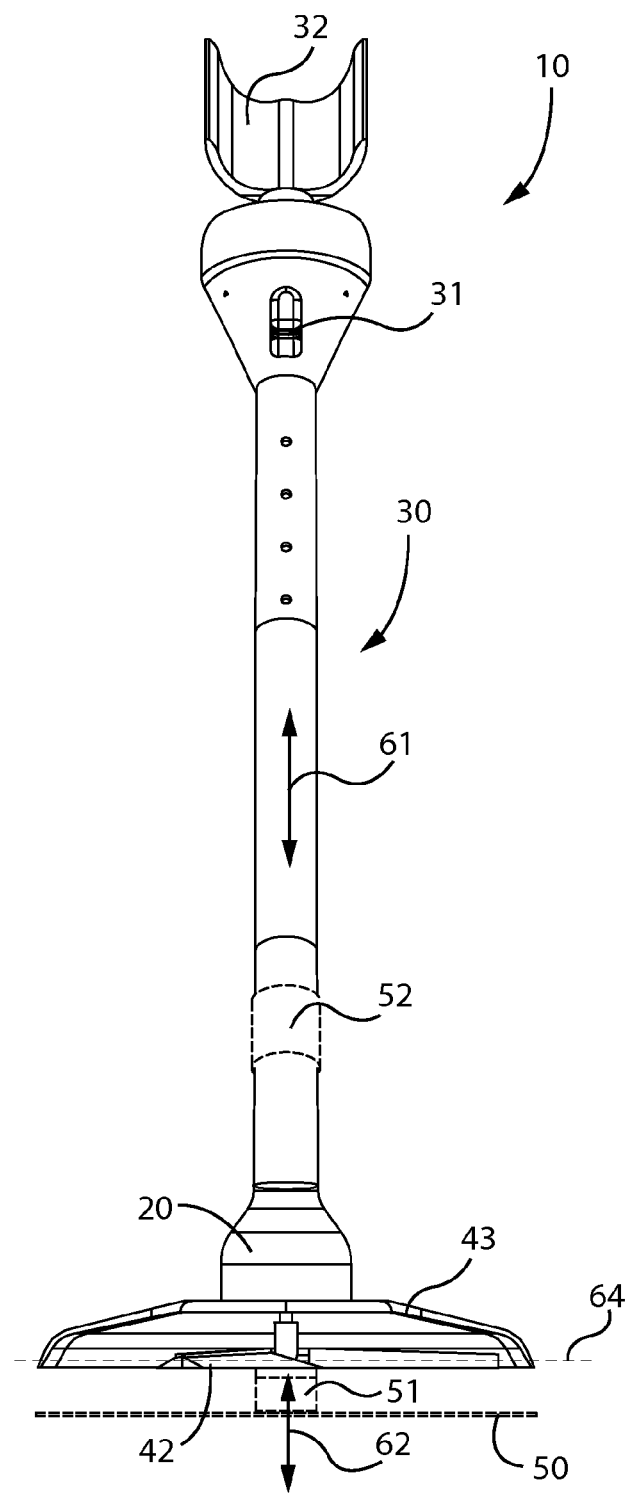
Figure 5:
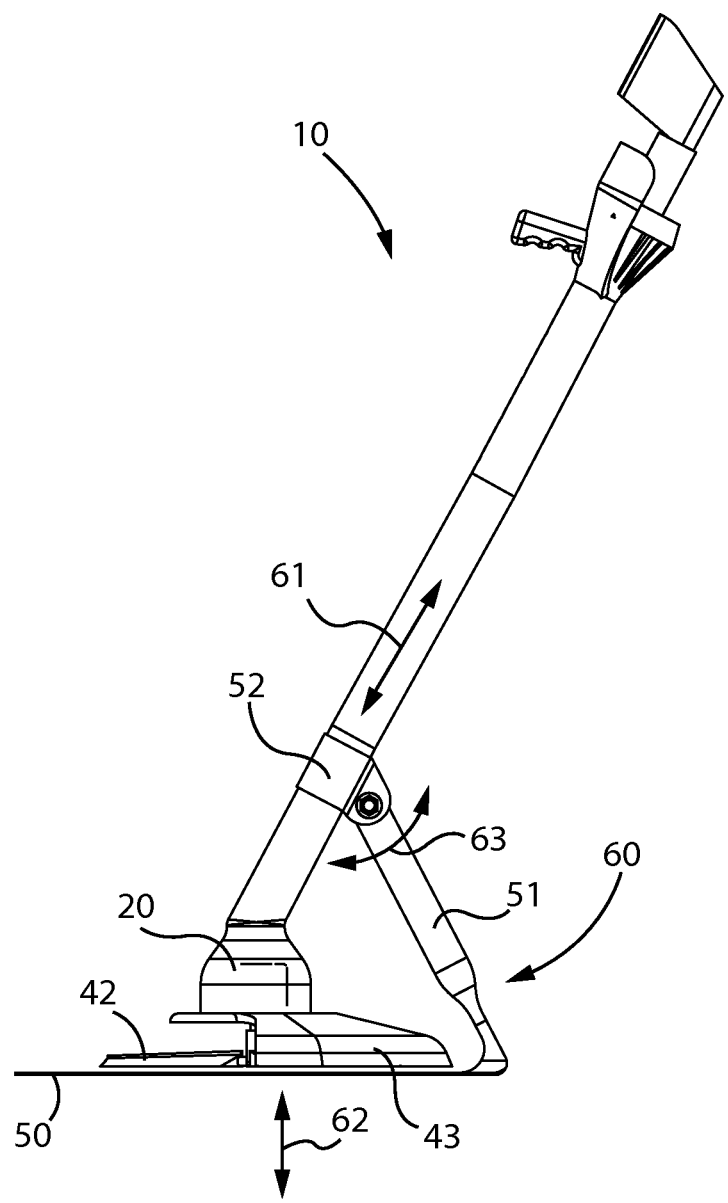
FIGS. 5-5b is a side elevational view of the grass cutter shown in FIG. 1.
Figure 5A:
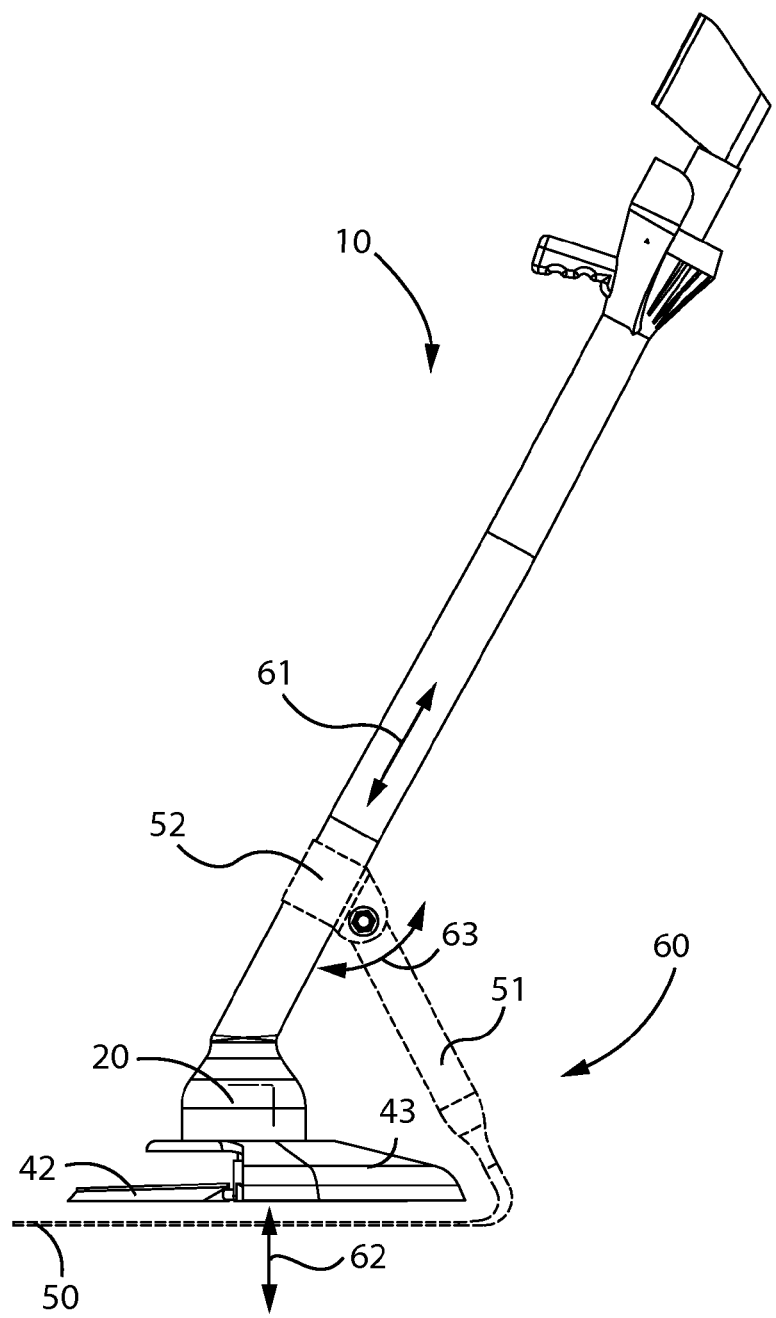
Figure 5B:
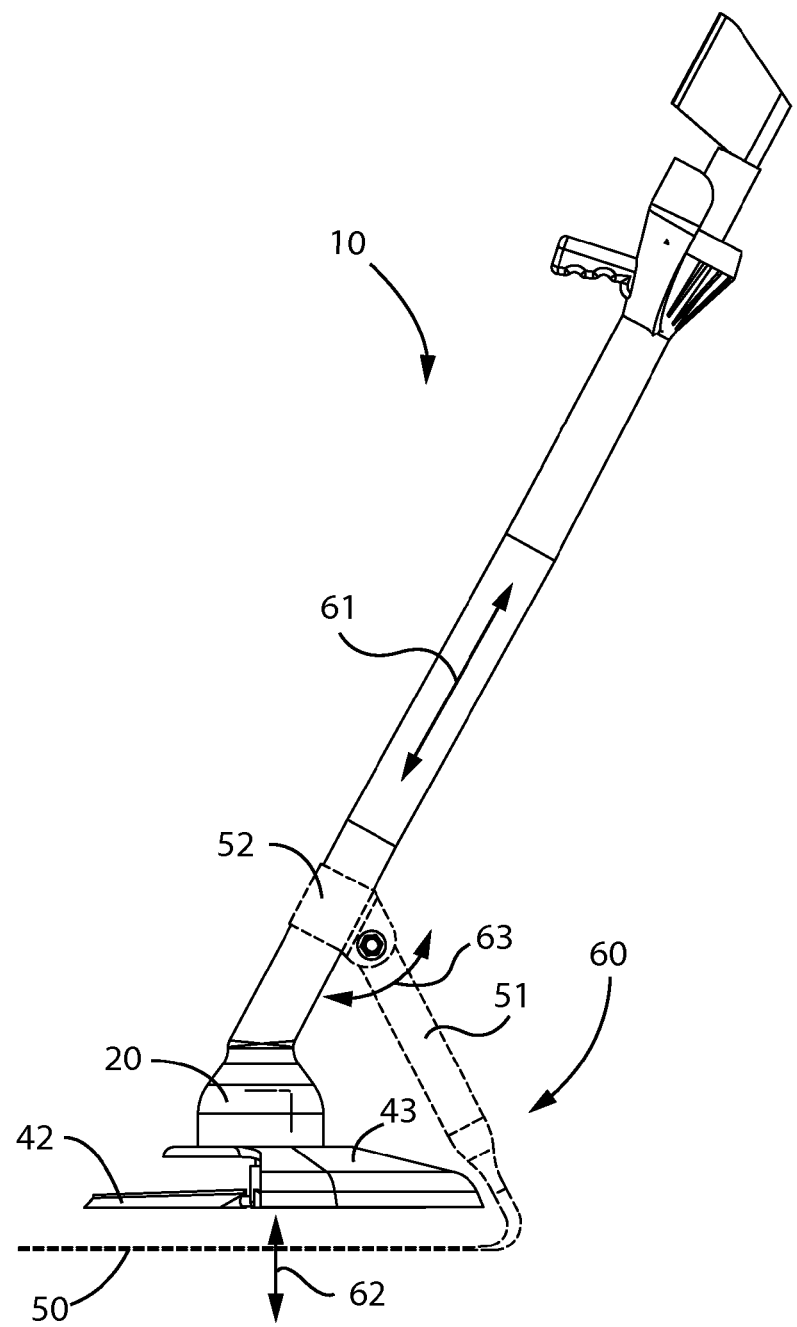
Figure 6:
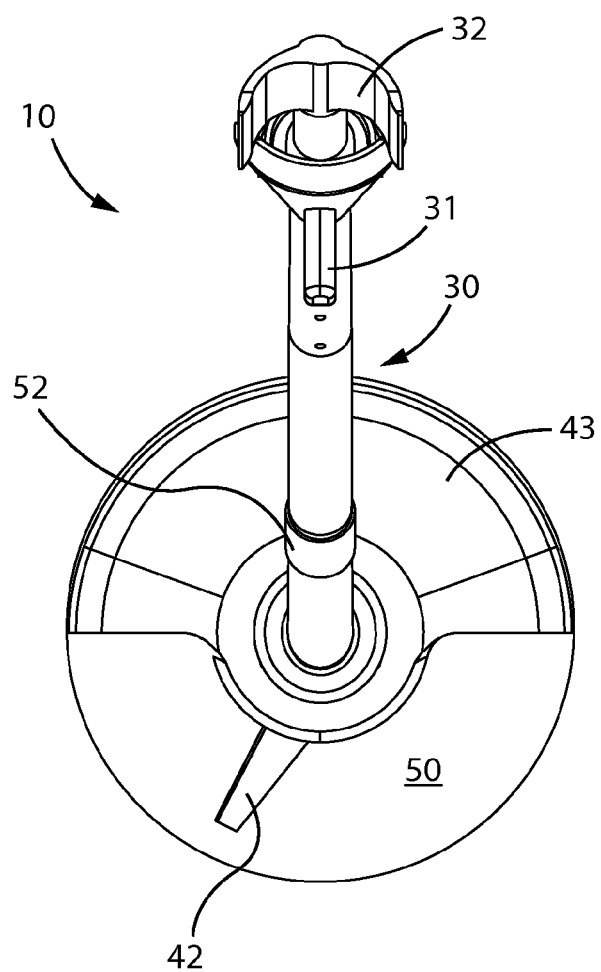
FIG. 6 is a top plan view of the grass cutter shown in FIG. 1.
Figure 7:
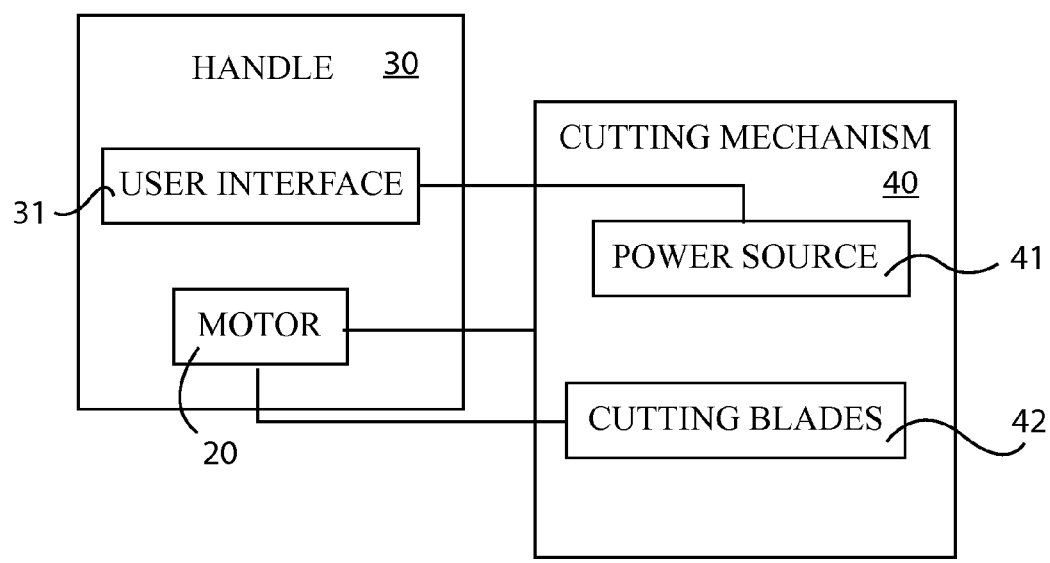
FIG. 7 is a high-level schematic block diagram showing the interrelationship between the major electronic components of the present invention.

In a non-limiting exemplary embodiment, as perhaps best shown in FIGS. 4-5b, linear reciprocation of the attachment bracket 52 along a first linear path 61 of the handle 30 preferably causes linear reciprocation of the disc 50 along a second linear path 62. Such a first linear path 61 may be registered parallel to a longitudinal length of the handle 30 and the second linear path 62 may be registered orthogonal to a rotating plane 64 of the blades 42. Such a structural configuration provides the unexpected and unpredictable advantage of balancing the weight of the disc 50 beneath the cutting mechanism 40 such that the disc 50 remains centered relative to the orientation of blades 42.

In a non-limiting exemplary embodiment, the disc 50 may have planar top and bottom surfaces positioned below the blades 42 while the support arm 51 remains attached to the attachment bracket 52. Such a structural configuration provides the unexpected and unpredictable advantage of reducing frictional contact and ensuring debris is not undesirably clogged in spaced limited regions between the disc 50 and blades 42.

In a non-limiting exemplary embodiment, a shield 43 having a semi-circular shape may be attached to the distal end of the handle 30 such that the blades 42s are intercalated between the shield 43 and the disc 50.

In a non-limiting exemplary embodiment, a curvilinear wrist brace 32 may be attached to a proximal end of the handle 30 and extends away from the cutting mechanism 40.

In a non-limiting exemplary embodiment, a method of utilizing a hand held grass cutter 10 may include the chronological steps of: providing an elongated handle 30 may have a user interface 31 adapted to be held by a user; providing and locating a motor 20 at the handle 30 wherein the motor 20 is communicatively coupled to the user interface 31; providing and locating a cutting mechanism 40 at a distal end of the handle 30; communicatively coupling the cutting mechanism 40 to the motor 20; providing and adjustably attaching a disc section 60 to the handle 30; spacing the disc section 60 subjacent to the cutting mechanism 40; and selectively displacing the disc section 60 between alternate positions defined beneath the cutting mechanism 40.

In a non-limiting exemplary embodiment, a grass cutter 10 may include motor 20, elongated hollow handle 30; and a cutting mechanism 40 hingedly mated to a distal end portion of the elongated handle 30. The motor 20 may be ergonomically positioned at the top of the handle 30 and may be connected to the cutting mechanism 40 by a transmission mechanism well known in the art. A rounded flat disc 50 suitably dimensioned, for example ¼ inch thick by 5' plate, to easily slide across weeds or grass may be adaptively mated to the distal end of the handle 30 via a support arm 51. In this way, the flat bottom surface of the disc 50 may be positioned below the cutting mechanism 40 while the support arm 51 may be attached to the handle 30 by way of an attachment bracket 52 detachably mated at a suitable location above the cutting mechanism 50. The attachment bracket 52 may include a plurality of clamps and lock nuts to ensure that the apparatus will not loosen when in use. The apparatus 10 acts as a support attachment and advantageously takes the weight off a user's hand and back and provides a guide when cutting grass.

In use, a user may attach the disc 50 to the grass cutter handle 30 by securely locking the support arm 51 by way of clamps and lock nuts. This may be done by first adjusting the position of the disc 50 to correspond to a desired height of the grass to be cut. The user may then proceed to cut or trim his lawn with the grass cutter 10. The disc 50 may be left in place on the handle 30 after use or be detached for storage separately in the event that the grass cutter 10 may be used for cutting plants and shrubs in the garden.

In a non-limiting exemplary embodiment, the grass cutter 10 may feature a safety shield that includes a slit to allow the support arm 51 of the disc 50 to attach to the grass cutter handle 30 through the safety shield without interfering with the shield. This may ensure that debris from the grass cutting process does not hit the body or eyes of the user.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed is:

1. A hand held grass cutter comprising:
   a handle provided with a user interface adapted to be held by a user;
   a motor located at said handle wherein said motor is communicatively coupled to said user interface;
   a cutting mechanism located at a distal end of said handle and communicatively coupled to said motor;
   a disc section attached to said handle and spaced subjacent to said cutting mechanism;
   wherein said disc section is selectively displaced between alternate positions defined beneath said cutting mechanism;
   wherein said disc section comprises
      a disc spaced beneath said cutting mechanism,
      a rectilinear support arm mated to an outer circumference of said disc and angularly offset from said handle, and an attachment bracket connected to said handle and adjustably connected to said support arm respectively;

wherein said cutting mechanism comprises
a plurality of blades communicatively coupled to said motor, and
a power source communicatively coupled to said user interface;
wherein said user interface is disposed at a proximal end of said handle and oppositely spaced from said disc section disposed at said distal end of said handle; and
a shield having a semi-circular shape and being attached to said distal end of said handle such that said blades are intercalated between said shield and said disc.

2. The hand held grass cutter of claim 1, wherein said attachment bracket is situated above said cutting mechanism, said support arm having a proximal end pivotally coupled to said attachment bracket and further having a distal end statically mated with said disc at a location subjacent to said cutting mechanism.

3. The hand held grass cutter of claim 1, wherein linear reciprocation of said attachment bracket along a first linear path of said handle causes linear reciprocation of said disc along a second linear path, said first linear path being registered parallel to a longitudinal length of said handle and said second linear path being registered orthogonal to a rotating plane of said blades.

4. The hand held grass cutter of claim 1, wherein said disc has planar top and bottom surfaces positioned below said blades while said support arm remains attached to said attachment bracket.

5. The hand held grass cutter of claim 1, further comprising: a curvilinear wrist brace attached to a proximal end of said handle and extending away from said cutting mechanism.

6. A hand held grass cutter comprising:
an elongated handle provided with a user interface adapted to be held by a user;
a motor located at said handle wherein said motor is communicatively coupled to said user interface;
a cutting mechanism located at a distal end of said handle and communicatively coupled to said motor; and
a disc section adjustably attached to said handle and spaced subjacent to said cutting mechanism;
wherein said disc section is selectively displaced between alternate positions defined beneath said cutting mechanism;
wherein said disc section comprises:
a disc spaced beneath said cutting mechanism;
a rectilinear support arm mated to an outer circumference of said disc and angularly offset from said handle; and
an attachment bracket connected to said handle and adjustably connected to said support arm respectively;
wherein said cutting mechanism comprises:
a plurality of blades communicatively coupled to said motor; and
a power source communicatively coupled to said user interface;
wherein said user interface is disposed at a proximal end of said handle and oppositely spaced from said disc section disposed at said distal end of said handle;
further comprising: a shield having a semi-circular shape and being attached to said distal end of said handle such that said blades are intercalated between said shield and said disc.

7. The hand held grass cutter of claim 6, wherein said attachment bracket is situated above said cutting mechanism, said support arm having a proximal end pivotally coupled to said attachment bracket and further having a distal end statically mated with said disc at a location subjacent to said cutting mechanism.

8. The hand held grass cutter of claim 6, wherein linear reciprocation of said attachment bracket along a first linear path of said handle causes linear reciprocation of said disc along a second linear path, said first linear path being registered parallel to a longitudinal length of said handle and said second linear path being registered orthogonal to a rotating plane of said blades.

9. The hand held grass cutter of claim 6, wherein said disc has planar top and bottom surfaces positioned below said blades while said support arm remains attached to said attachment bracket.

10. The hand held grass cutter of claim 6, further comprising: a curvilinear wrist brace attached to a proximal end of said handle and extending away from said cutting mechanism.

* * * * *